United States Patent
Liu et al.

(10) Patent No.: US 9,954,205 B2
(45) Date of Patent: Apr. 24, 2018

(54) SLOTTED BATTERY CAVITY FOR MULTIPLE CELL SIZES

(71) Applicant: Energizer Brands, LLC, St. Louis, MO (US)

(72) Inventors: Jyh-Dong Liu, North Olmsted, OH (US); Michael Brandon, North Ridgeville, OH (US); Chad E. Law, Milan, OH (US)

(73) Assignee: ENERGIZER BRANDS, LLC, St. Louis, MO (US)

( * ) Notice: Subject to any disclaimer, the term of this patent is extended or adjusted under 35 U.S.C. 154(b) by 74 days.

(21) Appl. No.: 15/096,873

(22) Filed: Apr. 12, 2016

(65) Prior Publication Data

US 2017/0294631 A1    Oct. 12, 2017

(51) Int. Cl.
| | | |
|---|---|---|
| *F21L 4/00* | (2006.01) | |
| *H01M 2/10* | (2006.01) | |
| *H01M 2/20* | (2006.01) | |
| *F21Y 101/02* | (2006.01) | |

(52) U.S. Cl.
CPC ............. *H01M 2/1027* (2013.01); *F21L 4/00* (2013.01); *H01M 2/1055* (2013.01); *H01M 2/204* (2013.01); *F21Y 2101/02* (2013.01); *H01M 2220/30* (2013.01)

(58) Field of Classification Search
None
See application file for complete search history.

(56) References Cited

U.S. PATENT DOCUMENTS

| | | |
|---|---|---|
| 4,563,727 A | 1/1986 | Curiel |
| 4,607,207 A | 8/1986 | Bruneau |
| 5,167,447 A | 12/1992 | Gonzales |
| 5,357,361 A | 10/1994 | Nishizawa |
| 5,489,485 A | 2/1996 | Peot et al. |
| 5,606,238 A | 2/1997 | Spellman et al. |
| 5,686,811 A | 11/1997 | Bushong et al. |
| 5,909,062 A | 6/1999 | Krietzman |
| 6,046,572 A | 4/2000 | Matthews et al. |
| 6,238,818 B1 | 5/2001 | Dalton |
| D443,374 S | 6/2001 | van Klinken |
| 6,388,390 B2 | 5/2002 | Rachwal |
| D474,554 S | 5/2003 | Dalton et al. |
| D479,014 S | 8/2003 | Yamamoto et al. |

(Continued)

FOREIGN PATENT DOCUMENTS

| | | |
|---|---|---|
| CN | 101375434 B | 2/2013 |
| EP | 1923933 B1 | 7/2009 |

(Continued)

*Primary Examiner* — Ashok Patel
(74) *Attorney, Agent, or Firm* — Alston & Bird LLP (57) ABSTRACT

A battery compartment for a device has a single cavity that is segmented into discrete slots, each slot associated with projections that secure and immobilize any batteries inserted into the compartment. Each slot is sized to receive a different size of battery, and the slots are positioned relative to one another to prevent batteries of different sizes from being inserted into the compartment. A shelf may be integrated within the slot(s), and the shelf may include a channel or a multi-planar yet unitary contact member to establish a single point of electrical connection between the battery compartment and the device.

23 Claims, 4 Drawing Sheets

(56) References Cited

U.S. PATENT DOCUMENTS

| | | |
|---|---|---|
| D484,627 S | 12/2003 | Mah |
| D496,482 S | 9/2004 | Osiecki et al. |
| 6,851,828 B1 | 2/2005 | Hansen |
| D507,672 S | 7/2005 | Fritz et al. |
| 6,942,359 B2 | 9/2005 | Furth et al. |
| 7,247,048 B2 | 7/2007 | Yokoyama |
| 7,309,139 B2 | 12/2007 | Au et al. |
| D574,529 S | 8/2008 | Squires et al. |
| 7,442,075 B2 | 10/2008 | Yokoyama |
| 7,514,172 B2 | 4/2009 | Furth et al. |
| D594,583 S | 6/2009 | Puglisi |
| D610,727 S | 2/2010 | Nyssen |
| 7,678,500 B2 | 3/2010 | Willey |
| 7,687,197 B2 | 3/2010 | Ladouceur et al. |
| 7,688,029 B2 | 3/2010 | Hoffman |
| 7,717,736 B2 | 5/2010 | Chua et al. |
| 7,780,309 B2 | 8/2010 | McMillan et al. |
| D625,447 S | 10/2010 | Brown et al. |
| D625,448 S | 10/2010 | Brown et al. |
| 7,850,330 B2 | 12/2010 | Spartano et al. |
| D631,825 S | 2/2011 | Onnerud et al. |
| D631,826 S | 2/2011 | Onnerud et al. |
| D631,827 S | 2/2011 | Onnerud et al. |
| D631,828 S | 2/2011 | Onnerud et al. |
| D631,829 S | 2/2011 | Onnerud et al. |
| D631,830 S | 2/2011 | Onnerud et al. |
| D631,831 S | 2/2011 | Onnerud et al. |
| D631,832 S | 2/2011 | Onnerud et al. |
| D631,833 S | 2/2011 | Onnerud et al. |
| 7,909,478 B2 | 3/2011 | Dallas |
| 7,910,244 B2 | 3/2011 | Ladouceur et al. |
| 7,959,317 B2 | 6/2011 | Spartano et al. |
| 8,044,634 B2 | 10/2011 | Hoffman |
| 8,142,925 B2 | 3/2012 | Ladouceur et al. |
| 8,197,085 B2 | 6/2012 | Spartano |
| 8,252,441 B2 | 8/2012 | Planck |
| D670,015 S | 10/2012 | Wu |
| 8,361,648 B2 | 1/2013 | Ladouceur et al. |
| 8,384,340 B2 | 2/2013 | Tarter |
| 8,586,224 B2 | 11/2013 | Furth et al. |
| 8,648,567 B2 | 2/2014 | Hoffman |
| 8,727,561 B2 | 5/2014 | Sharrah et al. |
| 8,779,683 B2 | 7/2014 | Snyder et al. |
| 8,813,866 B2 | 8/2014 | Suzuki |
| 8,851,006 B2 | 10/2014 | Burga |
| 8,906,531 B2 | 12/2014 | Caumont et al. |
| 8,919,988 B2 | 12/2014 | Unger et al. |
| 8,984,711 B2 | 3/2015 | Ota et al. |
| 9,005,784 B2 | 4/2015 | Bouffay et al. |
| 2003/0189826 A1 | 10/2003 | Yoon |
| 2004/0090777 A1 | 5/2004 | Lee |
| 2005/0122715 A1 | 6/2005 | Furth et al. |
| 2005/0197003 A1 | 9/2005 | Yokoyama |
| 2007/0082234 A1 | 4/2007 | Ladouceur et al. |
| 2007/0103114 A1 | 5/2007 | Hoffman |
| 2007/0172724 A1 | 7/2007 | Furth et al. |
| 2007/0232156 A1 | 10/2007 | Yokoyama |
| 2008/0292947 A1 | 11/2008 | Scherrer |
| 2008/0299839 A1 | 12/2008 | Chua et al. |
| 2008/0304258 A1 | 12/2008 | McMillan et al. |
| 2009/0001816 A1 | 1/2009 | Tarter |
| 2009/0040752 A1* | 2/2009 | Dallas ............ F21L 4/005 362/202 |
| 2009/0047572 A1 | 2/2009 | Pynenburg et al. |
| 2009/0061301 A1 | 3/2009 | Planck |
| 2009/0104516 A1* | 4/2009 | Yoshihara ......... H01M 2/105 429/149 |
| 2009/0135588 A1 | 5/2009 | Furth et al. |
| 2009/0142652 A1 | 6/2009 | Willey |
| 2009/0326329 A1 | 12/2009 | Yamane |
| 2010/0046211 A1 | 2/2010 | Spartano et al. |
| 2010/0119922 A1 | 5/2010 | Ladouceur et al. |
| 2010/0142195 A1 | 6/2010 | Hoffman |
| 2010/0304201 A1 | 12/2010 | Caumont et al. |
| 2011/0075407 A1 | 3/2011 | Spartano et al. |
| 2011/0129724 A1 | 6/2011 | Ladouceur et al. |
| 2011/0197389 A1 | 8/2011 | Ota et al. |
| 2011/0198103 A1 | 8/2011 | Suzuki |
| 2012/0236551 A1 | 9/2012 | Sharrah et al. |
| 2012/0301752 A1 | 11/2012 | Bouffay et al. |
| 2016/0033090 A1 | 2/2016 | Sharrah |
| 2016/0033091 A1 | 4/2016 | Sharrah et al. |
| 2016/0197502 A1* | 7/2016 | Waters ............ F21L 4/085 340/636.1 |

FOREIGN PATENT DOCUMENTS

| | | |
|---|---|---|
| JP | 5020552 A | 1/1993 |
| JP | 9320552 A | 12/1997 |
| JP | 10144273 A | 5/1998 |
| JP | 2000040402 A | 7/2000 |
| JP | 2000208117 A1 | 7/2000 |
| KR | 1560590 B1 | 10/2015 |
| WO | 2009/020708 A1 | 2/2009 |

* cited by examiner

SLOTTED BATTERY CAVITY FOR MULTIPLE CELL SIZES

FIELD OF INVENTION

The present invention relates to a battery compartment designed to accept cells of differing sizes. More particularly, the invention includes devices incorporating such compartments.

BACKGROUND

Since the introduction of differing standardized battery sizes (e.g., the American National Standards Institute's C18 series of designations and/or the International Electrotechnical Commission's 60086 standards), device manufacturers have attempted to strike a balance between providing users' of their devices with flexibility to rely on a variety of different battery sizes while simultaneously ensuring that user error in selecting or inserting the batteries into the device would not damage the device or injure the user. Perhaps the most ubiquitous approach was to design battery compartments for the device that would severely restrict the type of battery a user could install, with the most obvious distinction being the introduction of 9 volt (e.g., 6LR61 batteries in IEC nomenclature) in which a prismatic cell container is coupled with uniquely shaped positive and negative terminals on a common top surface of the battery itself.

As users gravitated toward round cylindrical battery sizes, such as AA, AAA, C, and D (e.g., respectively speaking, LR6, LR03, LR14, and LR20 in IEC nomenclature), device manufacturers designed battery compartments with round, cylindrical cavities whose diameter substantially matches the battery size of interest. Leaf or coiled spring contacts situated at the axial ends of the cavity and similarly engineered to only receive and maintain contact with that battery size. Differing examples of this well-known approach are illustrated/described in U.S. Pat. Nos. 6,238,818; 7,309,139; and 8,197,085.

An obvious drawback to this focus on a single size is that it limits the user's options for powering the device. Consequently, a number of schemes have been proposed to enable a device to receive and operate on batteries with differing sizes.

U.S. Pat. No. 8,727,561 shows a portable light or device with a battery compartment having smaller and larger transverse dimensions for receiving batteries of correspondingly smaller and larger sizes. A movable electrical contact adjusts to the appropriate length for the battery.

U.S. Pat. No. 7,909,478 discloses a portable lighting device with a battery compartment that is configured to include two subcompartments that selectively receive batteries of different sizes. One end of the battery compartment includes a contact assembly with first and second contact surfaces having an electrical contact that is common to the first and second surface. A circuit is coupled to the light source in order to provide current from only one of the battery types, and more specifically, to adapt the current based on the type of battery inserted into one of the sub compartments.

U.S. Pat. No. 6,851,828 describes a flashlight having an elongated body with a plurality of differently spaced and sized longitudinal grooves. An end cap is formed with a contact ring that selectively engages coplanar negative poles of the batteries in the elongated body, while a multi-planar contact is interposed at the end of the body which engages the lamp.

United States Patent Publication No. 2005/0122715 shows a flashlight housing with two battery locations capable of accommodating batteries of two different sizes. An electro-mechanical structure ensures that the housing cannot be closed—and, by extension, the light cannot be operated—if two batteries of different sizes are inserted. The use of different sized batteries can result in safety problems if/when the smaller sized battery is fully depleted before the larger sized battery which, in a series-type relationship, gives rise to the larger battery actually charging the smaller battery, thereby generating internal gassing and the potential for leakage.

In view of the foregoing, a device having a battery compartment that can receive different sized batteries, without accidental mixing of batteries of varying sizes, would be welcome. In particular, the compartment should minimize the need for specialized and/or moving parts while simultaneously streamlining the electrical connections and securely retaining the batteries in the event the device is dropped.

SUMMARY OF INVENTION

The following description and the drawings disclose various illustrative aspects. Some improvements and novel aspects may be expressly identified, while others may be apparent from the description and drawings.

In one embodiment, a device is contemplated having any combination of the following features:
  a battery compartment defined by:
    a cylindrical body having a distal end and an opposing end with an axis running between the distal and opposing ends;
    a first slot positioned within the body which may receive a first type of battery, said first slot having a first axial length and a first cross-sectional shape in an radial plane perpendicular to the axis;
    a second slot positioned within the body which may receive a second type of battery, said second slot having a second axial length and a second cross-sectional shape in the radial plane that is larger than the first cross-sectional shape;
    a unitary contact element positioned in the opposing end;
    a distal contact element positioned in the distal end;
    wherein the first type of battery has an identical voltage and a different container size in comparison to the second type of battery;
    wherein the first cross sectional shape overlaps with the second cross sectional shape to form a single, cavity with two segments within the body defined, in part, by at least two projections extending into the cavity, said projections cooperating with the first and second slots to immobilize radial movement of any batteries inserted therein independent of any compressive force exerted between the distal and unitary contact elements;
    wherein the unitary and distal contacts establish an electrical connection with any batteries inserted into the compartment;
    wherein the first axial length is different than the second axial length;

wherein an shelf is formed within the first or second slot so as to differentiate the first axial length from the second axial length;

wherein the shelf includes a channel which receives a portion of the unitary contact and further comprising a biasing member associated with the unitary contact so as to permit the unitary contact to move within the channel along the axis;

a third slot positioned within the body which may receive the first type of battery, said third slot having a cross sectional shape that is the same as the first cross-sectional shape and wherein the cross sectional shape of the third slot also overlaps with at least one of the first and the second cross sectional shapes to form a single cavity with three segments defined, in part, by at least four projections extending into the cavity, said projections cooperating with the first, second, and third slots to immobilize radial movement of any batteries inserted therein independent of any compressive force exerted between the distal and unitary contact elements;

wherein the first and third slots are positioned on opposing edges of the second cross-sectional shape;

wherein multiple batteries may be inserted into the second slot so as to generate the same voltage as when batteries are inserted in the first and third slots;

a third slot positioned within the body which may receive the first type of battery, said third slot having a cross sectional shape that is the same as the first cross-sectional shape;

a fourth slot positioned within the body which may receive the second type of battery, said fourth slot having a cross sectional shape that is the same as the second cross-sectional shape;

wherein the cross sectional shapes of the first and third slots overlap with at least one of: the cross-sectional shape of the second and fourth slots;

wherein the cross sectional shapes of the second and fourth slots overlap with at least one of: the cross-sectional shape of the first and third slots;

wherein the first, second, third, and fourth slots form a single cavity with four segments defined, in part, by at least four projections extending into the cavity, said projections cooperating with the first, second, third, and fourth slots to immobilize any batteries inserted therein independent of any compressive force exerted between the distal and unitary contact elements;

wherein any batteries inserted into the compartment form a parallel-type electrical connection;

wherein any batteries inserted into the first and third slots form a series-type electrical connection and any batteries inserted into the second and fourth slots form a series-type electrical connection;

wherein at least the first slot is defined by a plurality of first sidewalls comprising a plurality of arcuate sections;

wherein the second slot is defined by a plurality of second sidewalls comprising a plurality of arcuate sections;

wherein the arcuate sections include at least one flat-facing post;

wherein at least one of the slots is defined by at least three sidewall segments, said sidewall segments intersecting an imaginary arc of greater than 180 degrees in the radial plane;

wherein at least two of the sidewall segments also serve as the projections;

wherein the unitary contact has multi-planar shape conforming to a shelf within the first or second slot, said shelf differentiating the first axial length from the second axial length;

wherein the multiplanar shape comprises opposing terminal ends, said terminal ends each having a biasing member associated therewith to maintain electrical contact with any batteries inserted into the compartment;

a third slot positioned within the body which may receive the third type of battery, said third slot having a cross sectional shape that is different than the first and second cross-sectional shapes and wherein the cross sectional shape of the third slot also overlaps with at least one of the first and the second cross sectional shapes to form a single cavity with three segments defined, in part, by at least four projections extending into the cavity, said projections cooperating with the first, second, and third slots to immobilize radial movement of any batteries inserted therein independent of any compressive force exerted between the distal and unitary contact elements;

wherein the overlap of the first and second cross-sectional shapes prevents the first and second slots from simultaneously receiving batteries of different sizes;

wherein the overlap of the first, second and third cross-sectional shapes prevents the first, second, and third slots from simultaneously receiving batteries of different sizes;

wherein the first and second cross-sectional shapes are selected from: circular, oval, square, pentagonal, hexagonal, polygonal, asymmetric shapes, and combinations thereof;

an electrical appliance in electrical communication with the battery compartment to provide electricity to the device;

wherein the electrical appliance is proximate to the body at the opposing end;

wherein the electrical appliance comprises a flashlight; and/or wherein the flashlight includes at least one light emitting diode.

BRIEF DESCRIPTION OF THE DRAWINGS

The accompanying drawings illustrate various systems, apparatuses, devices and related methods, in which like reference characters refer to like parts throughout. The figures are essentially diagrammatic in nature and, unless indicated to the contrary, the elements in each are not necessarily drawn to scale.

DETAILED DESCRIPTION

Reference will now be made to exemplary embodiments, examples of which are illustrated in the accompanying drawings. It is to be understood that other embodiments may be utilized and structural and functional changes may be made. Moreover, features of the various embodiments may be combined or altered. As such, the following description is presented by way of illustration only and should not limit in any way the various alternatives and modifications that may be made to the illustrated embodiments. In this disclosure, numerous specific details provide a thorough understanding of the subject disclosure. It should be understood that aspects of this disclosure may be practiced with other embodiments not necessarily including all aspects described herein, etc.

As used herein, the words "example" and "exemplary" means an instance, or illustration. The words "example" or "exemplary" do not indicate a key or preferred aspect or embodiment. The word "or" is intended to be inclusive rather than exclusive, unless context suggests otherwise. As an example, the phrase "A employs B or C," includes any inclusive permutation (e.g., A employs B; A employs C; or A employs both B and C). As another matter, unless context suggest otherwise, the articles "a" and "an" are generally intended to mean "one or more" and the use of plural may be exemplary rather than mandatory.

Figure 1:
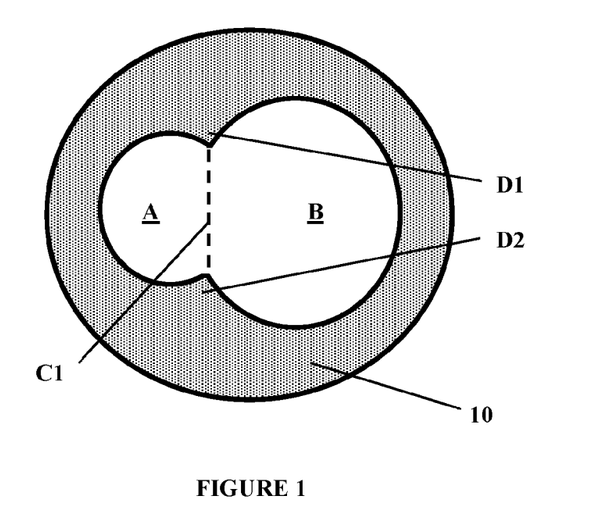
FIG. 1 illustrates a representative cross-section of one embodiment of the battery compartment of the invention.

As shown in FIG. 1, a battery compartment 10 for a device, such as a flashlight, comprises a plurality of slots A, B. Slots A and B are essentially hollow cavities shaped to receive batteries. In a preferred embodiment, the slots have a substantially circular cross section, but with the diameter of slot A being less than that of slot B and, more specifically, with the diameter of slot A being only slightly larger than a first, standardized battery size (as noted above) and the diameter of slot B being only slightly larger than a second and differently sized standardized battery size. In other embodiments, the overall shape of the slots A and B may be the same or different. Alternative cross-sectional shapes may include ovals, squares, pentagons, hexagons, other polygons or asymmetric shapes constituting a combination of the foregoing (e.g., partially curved on one side, with a flat or beveled shaped on the opposing side). Still further embodiments contemplate asymmetric or other shapes in which at least three points intersect with an arc that is greater than 180 degrees (i.e., greater than 50% of the circumference of a circle that is overlaid on the three or more points in question). In some embodiments, the cross-sectional shape may vary along the length of the cylinder, with the shape(s) repeating in two or more separate planes drawn perpendicular to the axis of the cylinder. The salient feature of whatever cross-sectional shape is selected is that it must sufficiently engage the sidewalls of the battery inserted in the slot so as to prevent unwanted lateral movement (or radial movement, to the extent the cross-section and battery are circular). As such, it is anticipated that physical contact or relatively small tolerances will cooperate with the sidewalls of slots A and B and the battery (or batteries) at a sufficient number and positioning of locations to hold it firmly in place.

Figure 2A:
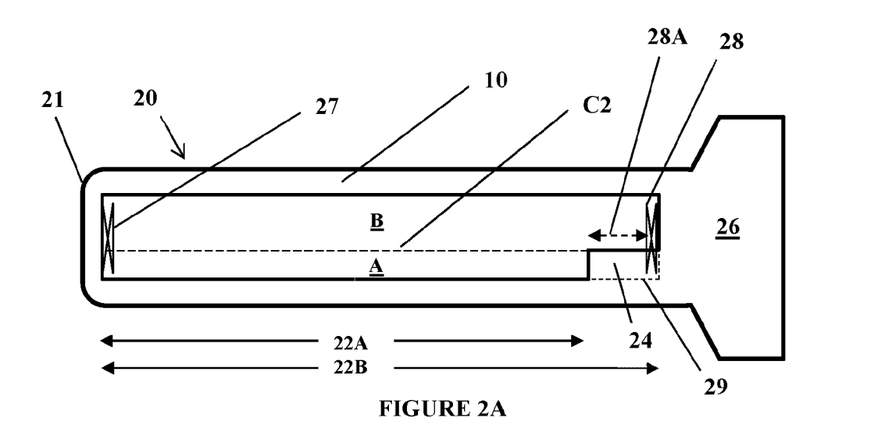
FIG. 2A is a side view of an exemplary device according to one embodiment of the invention utilizing a shelf to differentiate the length of the slots.

Another salient feature is that the slots must be positioned so as to overlap each other along one edge so as to create a single, contiguous cavity. In some embodiments, projections D1 and D2 define the boundaries that separates the cavity into two segments corresponding to slots A and B. Further, projections D1 and D2 restrain the battery within the appropriate slot and restrict unwanted movement without the need for excessive axially compressive force being exerted on the battery terminals. To ensure maximum effect, projections D1 and D2 preferably extend along the entire axial length of the cylinder forming compartment 10 (i.e., 22A and 22B as shown in FIG. 2A and described below), although in some embodiments these projections may be staggered so as to potentially save on materials cost (so long as the projections still restrain all of battery sizes potentially accommodated by compartment 10).

An imaginary line C1 spans the shortest point between D1 and D2, effectively separating the major portions of slot A from slot B and defining two separate battery cavity segments. The length line C1 will be less than the diameter of the smaller sized slot (in the event that slot is circular in shape) and/or less then the maximum distance between the farthest points of the polygon. This arrangement secures and restrains the batteries therein, preventing them from becoming dislodged or otherwise migrating out of position within the compartment 10 (e.g., radial movement into the adjoining segment) without the need for exerting excessive compressive force on the batteries.

Because slots A and B overlap to some degree, the insertion of batteries into one of these slots necessarily will prevent the user from improperly inserting batteries into the other slot. Similarly, the sizing of the slots A and B to closely match an intended battery size (e.g., AA and AAA) will prevent the user from improperly inserting batteries into the wrong slot—or, more precisely, will prevent the user from inserting batteries that are not appropriately sized for the device from being introduced to the compartment while simultaneously providing the user with instant, tactile recognition in the event the smaller battery is improperly inserted into the larger slot (by way of the batteries not being secured into that slot).

The compartment 10 may be injection molded, three-dimensionally printed or otherwise fabricated so as to form a single piece. Advantageously, a long continuous tube or cylinder could be manufactured and subsequently cut or divided into parts that would be usable in multiple, different devices. Further, the outermost shape of the compartment 10 can serve as the exterior or outer-most facing element of the device, especially in the event compartment 10 is incorporated with a flashlight. Almost any material is appropriate, although plastics are anticipated to afford the greatest degree of flexibility and cost effectiveness. The exterior or outer most facing shape of compartment 10 may be smoothly rounded, curved or flat—thereby imparting a circular, oval or polygonal cross-sectional shape. Ultimately, the cylindrical shape of the compartment 10 will share the same elongated axial orientation of the batteries received within that compartment (also see FIG. 2A). While compartment 10 is illustrated as a solid piece, it may be possible to form portions with one or more foramina, slots, channels or other hollowed out portions—contiguous with or independent from—the battery cavity to allow for electrical connections, provide additional components and/or save on material costs.

Depending upon the device, it may be possible to form the compartment from an electrically conductive material.

Alternatively, an insulating or non-conductive material may be used in combination with the provision of electrical connections.

FIG. 2A illustrates a side view of a lighting device 20 that incorporates battery compartment 10. As before, slots A and B define battery cavities, with imaginary plane C2 defining the approximate boundaries of each cavity. As shown in FIG. 2A, the axial length 22A of the cavity defined by slot A is different from the axial length 22B of slot B. As in FIG. 1, lengths 22A and 22B are selected to substantially match a predetermined battery size or a combination of batteries provided in series.

The differential in axial lengths of slots A and B may give rise to the creation of a shelf 24 in some embodiments of the invention. The shelf is optimally situated proximate to the lighting element 26, with the excess interior volume between the shelf 24 and the element 26 potentially allowing for internal circuits, drivers, safety components, switching elements and other components commonly associated with lighting and other devices that are amenable to the invention. Further, by providing this interior volume in close proximity to the lighting element and the batteries (not shown) and contact element 30, cost savings and an overall reduction in complexity may be realized.

The distal end 21 of device 20 (i.e., the end located opposite to the lighting element 26) may be provided with a single contact surface 27. In some embodiments, this contact surface 28 may be integrated into a removable end cap, or it may be fixed (permanently or in a movable manner) within or onto the compartment 10. This cap may be hinged, screwed on, snapped on or slid into place. The contact surface 27 may constitute a coiled or leaf spring alone, or a biasing mechanism may be interposed between a conductive member and the distal end to provide sufficient force to ensure good physical contact is maintained with the terminals of the batteries housed in compartment 10. By the same token, the contact surface 27 should be of negligible resistance (or sufficiently low resistance) so as not to impede performance of the battery and/or device.

The contact element 28 that is associated with the lighting element end of device 20. The element 28 may constitute a single-surface member that substantially spans the diameter of slots A and B as shown in FIG. 2A. To the extent a shelf 24 is incorporated, the element may be fitted within a channel 29, indicated by dashed lines and formed at the proximal end of slot A. One or more biasing members within the contact element (and more specifically, interposed between the single contact surface and the end abutting element 26) urges the element through the range of motion indicated by 28A and, ultimately, into contact with the axial end of a battery or series of batteries (not shown) in the cavity formed by slot A. An integral hinge and/or sufficient flexibility of the element 28 allows the element 28 to retract into position to receive and maintain contact with axial end of batteries to the extent batteries are provided to the cavity formed by slot B. As above, the contact element 28 should be of negligible resistance (or sufficiently low resistance) so as not to impede performance of the battery and/or device.

Figure 2B:
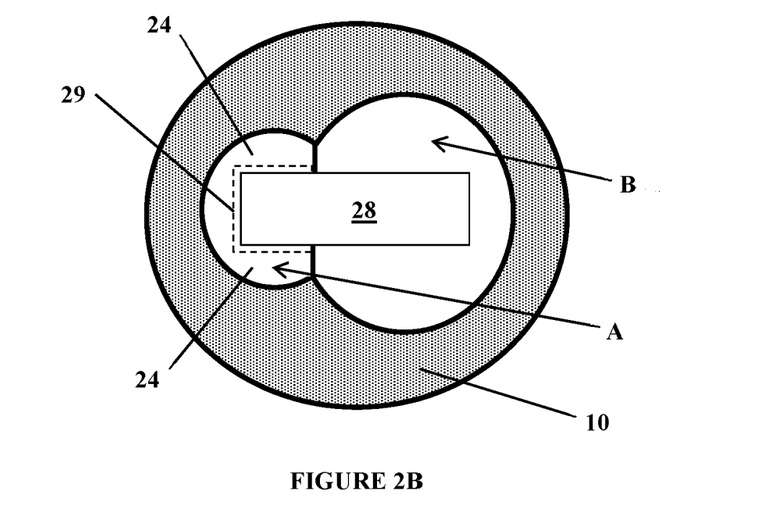
FIG. 2B illustrates a representative cross-section showing the relative positioning of the shelf and channel one embodiment of the battery compartment of the invention.

FIG. 2B is a cross-sectional top view, similar to FIG. 1, indicating the location and shape of the contact 28 relative to the presence of a shelf 24 and channel 29. Contact element 28 must be sufficiently large to establish and maintain physical contact with the battery terminal. As such, the edge of contact element 28 extending into slot A, whatever their respective geometric shapes may be, must engage the centerpoint of slot A, and the edge of contact element 28 extending into slot B must similarly engage the centerpoint of slot B. In the same manner, channel 29 must be sufficiently sized to permitted element 28 to move freely throughout the range indicated by 28A in FIG. 2A; however, sufficient surface area must be provided to shelf 24 to engage the batteries inserted into slot A so as to ensure they will be retained firmly therein.

Figure 3:
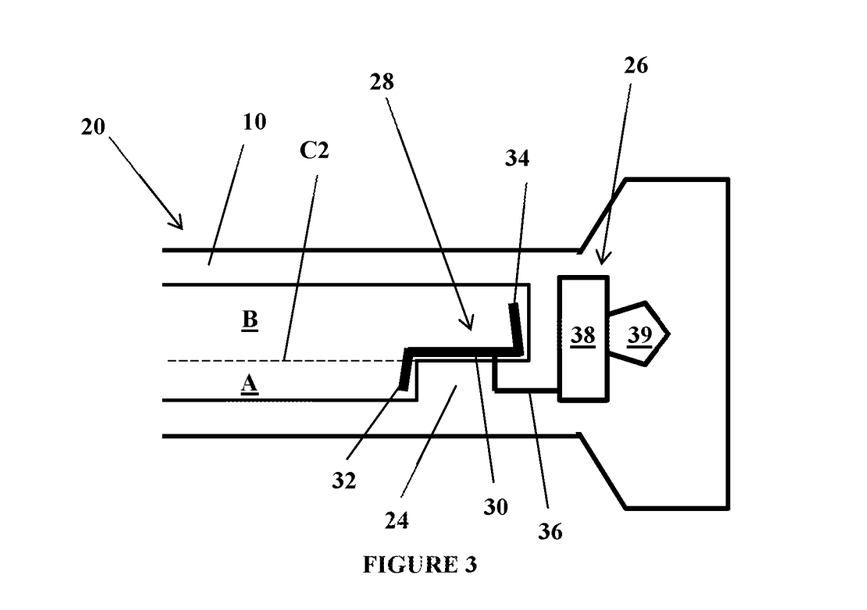
FIG. 3 is a close-up, side view of an alternative multi-planar single contact member conforming to an integral shelf of the compartment according to one embodiment of the invention.

As a further embodiment, contact element 28 constitutes a multi-planar unitary contact member 30 conforms to the shape of the shelf 24, as shown in FIG. 3. The terminal arms 32 and 34 may be integrally formed leaf springs, and/or backed by one or more optional biasing members (not shown), such as coil springs, deformed and/or resilient plastic members and the like, in order to maintain good contact with batteries placed in slot A or slot B.

In any embodiment, contact element forms an electrical connection to the lighting element 26, which encloses and protects the circuitry and/or components inherent to the functioning of the light itself. In preferred embodiments, the connection 36 may be reduced to a single point. Electricity flows through connection 36 and into LED driver 38 which, in turn, is connected an single light emitting diode (LED) or LED array 39. The driver may include features to dim the light, to maximize run-time and/or to produce a variety of other effects, particularly to the extent multiple LEDs are provided in array 39.

Figure 4:
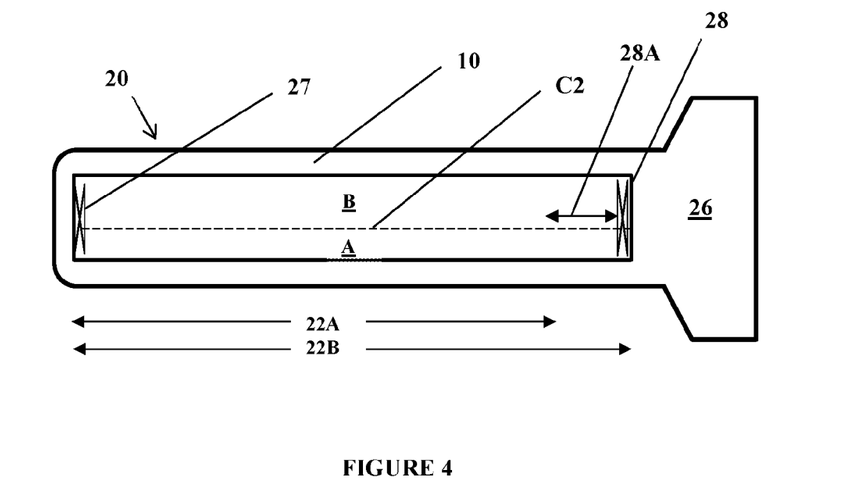
FIG. 4 is a side view of an exemplary device according to another embodiment of the invention in which the length of the slots are identical.

In slight derivative shown in FIG. 4, the axial lengths 22A and 22B may be substantially identical, and the contact element is shaped to substantially conform to the interior shape of the cavities formed by slots A and B. Alternatively, the contact element may be substantially rectangular (i.e., similar to element 28 shown in FIG. 2B), with a length that is less than or almost equal to the length of line C1 and width that is less than or almost equal to the maximum distance between opposing sidewalls of slots A and B. Flanges, flares or other projections may be provides along one or more edges of such a rectangularly shaped contact. In these embodiments, the biasing member urges the element 28 through the range of motion indicated by 28A to engage and maintain contact with batteries therein. Here, the biasing force should be exerted across a substantial portion of the element 28 (i.e., along significant portions of the contact member located in both slot A and slot B). As still further embodiments, a plurality of biasing mechanisms may be used, with mechanisms associated with the smaller of slots A and B exerting relatively greater biasing force in comparison to the mechanisms associated with the larger slot so as to ensure that sufficient contact is maintained with the smaller sized batteries/slot. It should noted that, because the biasing force need not be sufficient to physical immobilize the batteries (as this restraint is provided by the projections defining the slots, as noted herein), the amount of force required is less than otherwise required to maintain a forced fit.

One or more user inputs and/or controls, such as push buttons, slide switches, toggle switches, and the like, may be provided anywhere in/on the body of device 20, including the distal end 21, the battery compartment 10, the light element 26 and/or other points that allow the user to engage the controls. Such controls may be a simple switch to connect and disconnect the flow of electricity, or they may include more nuanced inputs to enable the driver 38 to produce the desired lighting output and/or effects from array 39 according to the user's actions.

As noted above, appropriate connection must also be established with the countervailing contact 27. If portions of the compartment are made of conductive materials (and/or if such materials or wires are enclosed therein), appropriate insulation is provided along any point where there may be potential for an unintended short circuit with the following non-limiting examples: wires may be insulated; cavities may be coated with insulating materials; the construction process for making compartment 10 may selectively integrate conductive and insulating materials; and/or insulating components may utilized (e.g., by bifurcating the compartment 10 and/or light element 26 and allowing for a disc or other barrier to be inserted, mounted or screwed into place).

The biasing force associated with contacts 27, 28, and/or 30 need only to be sufficient to maintain physical contact with the appropriate battery terminal in some embodiments and, because the slots A and B are already physically designed to retain and restrain the batteries, it is not necessary that to provide a force-fit between the contacts that eliminates any radial movement. This reduction in force makes it easier for users to insert and remove batteries, while simultaneously reducing the possibility of accidental damage to the batteries and device/compartment.

The cylindrical body of the battery compartment containing the components constituting the invention general preferably has a longer axial length in comparison to its radial width, as this arrangement allows the exterior surface of the cylinder to serve as a handle or grip for the device itself, and especially when the device is a flashlight. In this regard, rounded and circular cross-sectional shapes are expected to have particular utility. As used throughout this specification, the term axial is synonymous with the height or axis of such a cylinder, whereas the diameter may be referenced as radial or the width of that cylinder. It is not necessary for the cylindrical body to symmetric or uniform along either its length or width.

While the embodiments illustrated in the FIGS. 1-3 discussed above contemplate the insertion of an identical number of batteries into either slot A or slot B, it is possible to design a compartment 110 that receives two batteries in a stacked series in slot A1, and to provide for the two larger batteries to be inserted into separate slots B1 and B2. This arrangement is illustrated in FIG. 4. In such an arrangement, the batteries in slots B1 and B2 may be inserted in opposite directions relative to one another, and a series-style electrical connection is made at the distal end to properly maintain the voltage delivered by the batteries in slots B1 and B2, either by providing a single metallic contact strip or by hard-wiring separate contact surfaces. In contrast, the contact at the distal end associated with slot A may be as described above, or it may be a simple contact surface or spring, so long as it creates an appropriate, independent (i.e., not in contact with the series connection for slots B1 and B2) connection with the driver circuit. In this case, the slots must be sufficiently spaced so that projections D11, D12, D13, and D14 cooperate to restrain the batteries in their respective slots, while simultaneously retaining the overlap feature to prevent improper insertion of cells into the wrong slot. The connection at the light element end may incorporate a shelf (with or without the channel) or unitary, biased member that engages the batteries in the appropriate slot(s) in a manner similar to that described above. These configurations may have particular utility in prismatic-style cylinders possessing a more rectangularly shape. Alternative arrangements in which parallel connections are provided for slots B1 and B2 are possible, especially in the event the lighting element circuitry is configured to adapt accordingly.

Figure 5A:
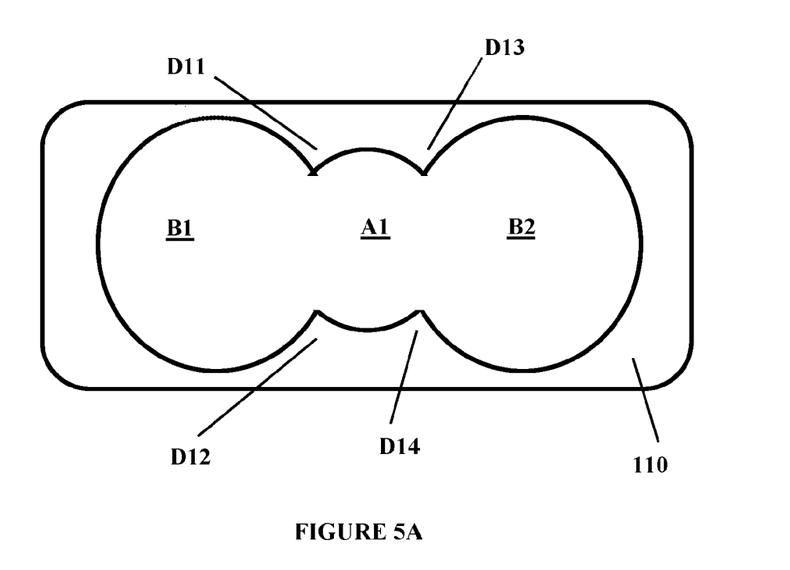
FIGS. 5A and 5B illustrate representative cross-sections showing the battery compartments with additional slots according to certain embodiments of the invention.
Figure 5B:
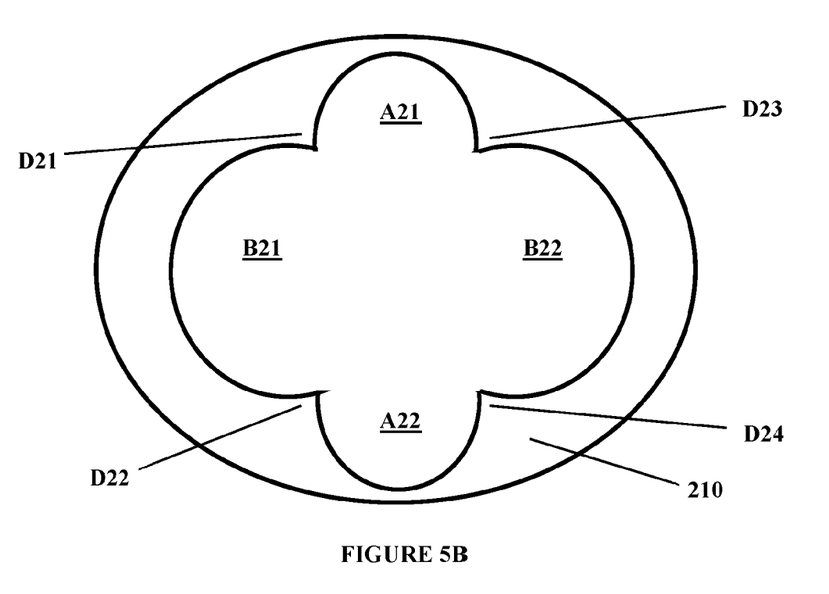

In the same manner, a plurality of slots A21 and A22 can be created for smaller batteries, with slots B21 and B22 receiving larger batteries according to compartment 210 shown in FIG. 5B. As before, the resulting cloverleaf-style cross-sectional cavity includes projections D21, D22, D23, and D24 to ensure proper spacing and retention of the batteries, as well as the fail-safe overlap to prevent improper installation. This arrangement also allows for either series or parallel connections between the battery or batteries placed into slots A21 and A22 or B21 and B22. If a series connection is desired, the batteries must be inserted in opposite directions (as noted above) and simple metal plate or pair of strips or other connection can be provided at the distal end so as to cover the centerpoints of each of slots A21, A22, B21 and B22, and the need for a separate, return connection from the distal end (e.g., through a foramen in the compartment 210) is avoided.

Conversely, compartment 210 creates an opportunity to arrange batteries in parallel. This arrangement affords wider flexibility in the power requirements for the device. The principles of establishing connections are substantially similar to those associated with the embodiments in FIGS. 2A through 4, with appropriate adjustments being made to the shape of the contact 28 (e.g., a cross-shaped element may be advantageous for use in the event channels are incorporated into a shelf).

With respect to the use of round cylindrical batteries (e.g., AA, AAA, C, D, etc.), it should be understood that the slots need not have completely contiguous side walls. It may be possible to provide curved rib sections at selected (and opposed) points so as to create the appropriate restraint. For example, rather providing the continuous "C" shape shown in FIG. 1 for slot A, it may be possible to form discrete arcuate sections. For example, two, three, four, five or six circular or nearly circular arcs between 10 polar degrees and 180 polar degrees can be situated in place of the contiguous C shape, with separate arcuate sections at the terminal points (i.e., at points D1 and D2 in FIG. 1). More preferably, the arcuate sections span 20 to 90 polar degrees. These arcuate sections engage and restrain the battery without the added expense of providing fully formed walls. Such arcuate section may be injection molded, three dimensionally printed or otherwise integrated into a unitary compartment as contemplated above. Flat-facing posts may be used as substitute for or in addition to the arcuate sections, although it is expected that a greater number of such posts would be required to form and perform the functions of the slots. The flat face of the posts (i.e., a substantially straight edge forming a tangent to the circular shape of the battery inserted in that slot) would ultimately provide a contour for the polygonal cross-sectional shapes described above. In any event, to form a slot within the meaning of the invention, the sidewalls, arcuate sections and/or posts must fully immobilize the batteries intended for the particular slot so that they do not migrate into the larger cavity.

In this regard, it will be further understood that the shape of the slots can be defined with reference to the circumference of the batteries designed to fit therein. Generally speaking, a sidewall (whether continuous or spanned by arcuate sections) for a slot must be greater than at least 51% of the circumference of the battery for which it was designed. More preferably, it should encompass at least 55%, 60%, 70% or 75% of the intended battery. The precise value for the circumference need not be the same for the two sizes of batteries contemplated, and it may be possible, as an example, to design one slot to engage 55% of the circumference whereas the corresponding slot engages more than 60% of the circumference of its battery. Other values are, of course, possible.

As previously noted, the sidewalls and/or arcuate sections can occur at least three separate locations within each slot.

These three locations all intersect with and define an imaginary arc of at least 180 degrees (and/or more than 50% of the circumference of a circle) in the plane perpendicular to the axis of the cylindrical body. In these embodiments, at least two of the sidewalls in this embodiment may serve as the projections (e.g., D1, D2, D11, D12, etc.) needed to immobilize the battery within the slot, as also described above. Also, it would be possible for a single sidewall or arcuate section to serve as the projection for separate but adjacent slots (e.g., in FIG. 1, D1 could serve as a location for an arcuate section defining both slot A and B).

In all cases, the slots should be positioned relative to one another so as to create interference preventing batteries from being inserted to all the slots (e.g., in FIG. 1, batteries would only fit in one of slot A or slot B, whereas in FIG. 5A the selection would be between slot A1 or slots B1 and B2 and in FIG. 5B the selection is between A21 and A22 or B21 and B22, etc.). This approach serves as a fail-safe precaution, and it avoids the dangers of inadvertent cell charging and/or incorrect voltage being supplied to the device.

With respect to FIGS. 5A and 5B, it will be understood that any of the slots may utilize a shelf, as in FIGS. 2A and 2B, or a sliding unitary contact as in FIG. 3. Further, while the illustrated version contemplates the use of two different battery types, it may be possible to design the third and/or additional slots to accept a third battery type that is different from those received in the other two slots.

In any of the embodiments electronic or mechanical reversal protection may be included. Such reversal protection ensures that the device will not operate, alert the user and/or prevent the user from successfully installing batteries incorrectly.

Another advantage of the foregoing embodiments is that the compartment relies on a single set of contacts—one at the distal end and the other proximate to the opposing end—to make electrical connections, irrespective of the type of batteries inserted into the compartment. This arrangement reduces the parts and complexity required to incorporate the compartment into devices. Of course, the batteries for which the device is designed must necessarily possess the same voltage and/or the length (and, by extension, number of batteries that may be accommodated in any given slot) must be selected so that the voltage received from the slots is identical (except for situations like FIG. 4 when a series-type connection is established between multiple slot and a parallel connection is made within a single slot). Discrepancies in the electrical characteristics provided by the various slots may also be addressed by circuitry (solid state or analog).

In order to better accommodate the movement of the unitary contact member, it may be possible to incorporate guides, channels and blocking stops within the sidewalls of the slot(s) to engage the contact and direct/facilitate its range of motion. In these embodiments, one or more biasing members may be incorporated into the guides so as better distribute the biasing force. As above, this biasing force is independent of the force required to immobilize the batteries because the projections defining the slots/segments in the cavity already provide such stability.

The foregoing description identifies various non-limiting embodiments of the invention. Modifications may occur to those skilled in the art and to those who may make and use the invention. The disclosed embodiments are merely for illustrative purposes and not intended to limit the scope of the invention or the subject matter set forth in the claims.

What is claimed is:

1. A device comprising:
    a battery compartment defined by:
        a body having a distal end and an opposing end with an axis running between the distal end and the opposing end;
        a first slot positioned within the body and configured to receive at least one battery of a first battery type, said first slot having a first axial length and a first cross-sectional shape in a radial plane perpendicular to the axis;
        a second slot positioned within the body and configured to receive at least one battery of a second battery type, said second slot having a second axial length and a second cross-sectional shape in the radial plane that is larger than the first cross-sectional shape;
        a unitary contact element positioned in the opposing end; and
        a distal contact element positioned in the distal end;
        wherein: a) the at least one battery of the first battery type has an identical voltage and a different container size in comparison to the at least one battery of the second battery type; b) the first cross sectional shape overlaps with the second cross sectional shape to form a single cavity with two segments within the body defined, at least in part, by at least two projections extending into the cavity, said at least two projections cooperating with the first slot and the second slot to immobilize radial movement of batteries inserted therein independent of any compressive force exerted between the distal contact element and the unitary contact element; and c) the unitary contact element and the distal contact element establish an electrical connection with batteries inserted into the battery compartment; and
    an electrical appliance in electrical communication with the battery compartment to provide electricity to the device.

2. The device according to claim 1, wherein the electrical appliance comprises a flashlight.

3. The device according to claim 2, wherein the flashlight includes at least one light emitting diode.

4. The device according to claim 1, wherein the first axial length is different than the second axial length.

5. The device according to claim 1, wherein a shelf is formed within the first or second slot so as to differentiate the first axial length from the second axial length.

6. The device according to claim 5, wherein the shelf includes a channel which receives a portion of the unitary contact element and further comprising a biasing member associated with the unitary contact element configured to permit the unitary contact to move within the channel along the axis.

7. The device according to claim 1, further comprising a third slot positioned within the body and configured to receive at least one battery of the first battery type, said third slot having a cross sectional shape that is the same as the first cross-sectional shape and wherein the cross sectional shape of the third slot overlaps with at least one of the first cross sectional shape and the second cross sectional shape to form a single cavity with three segments defined, at least in part, by at least four projections extending into the cavity, said at least four projections cooperating with the first slot, the second slot, and the third slot to immobilize radial movement of batteries inserted therein independent of any compressive force exerted between the distal contact element and the unitary contact element.

8. The device according to claim 7, wherein the first slot and the third slot are positioned on opposing edges of the second cross-sectional shape.

9. The device according to claim 7, wherein the second slot is configured to accept a plurality of batteries of the second battery type so as to generate the same voltage as when at least one battery of the first battery type is inserted in each of the first slot and the third slot.

10. The device according to claim 1, further comprising:
a third slot positioned within the body and configured to receive at least one battery of the first battery type, said third slot having a cross sectional shape that is the same as the first cross-sectional shape;
a fourth slot positioned within the body and configured to receive at least one battery of the second battery type, said fourth slot having a cross sectional shape that is the same as the second cross-sectional shape; and
wherein: a) the cross sectional shapes of the first slot and the third slot overlap with at least one of: the cross-sectional shape of the second slot and the fourth slot; b) the cross sectional shapes of the second slot and the fourth slot overlap with at least one of: the cross-sectional shape of the first slot and the third slot; and c) the first slot, the second slot, the third slot, and the fourth slot form a single cavity with four segments defined, at least in part, by at least four projections extending into the cavity, said at least four projections cooperating with the first slot, the second slot, the third slot, and the fourth slot to immobilize batteries inserted therein independent of any compressive force exerted between the distal contact element and the unitary contact element.

11. The device according to claim 10, wherein said battery compartment is configured to form a parallel-type electrical connection among a plurality of batteries inserted into the cavity.

12. The device according to claim 10, wherein said battery compartment is configured: to form a series-type electrical connection among a plurality of batteries of the first battery type inserted into the first slot and the third slot, and to form a series-type electrical connection among a plurality of batteries of the second battery type inserted into the second slot and the fourth slot.

13. The device according to claim 1, wherein at least the first slot is defined by a plurality of first sidewalls comprising a plurality of arcuate sections.

14. The device according to claim 13, wherein the second slot is defined by a plurality of second sidewalls comprising a plurality of arcuate sections.

15. The device according to claim 13, wherein the arcuate sections include at least one flat-facing post.

16. The device according to claim 1, wherein the electrical appliance is proximate to the body at the opposing end.

17. The device according to claim 1, wherein the unitary contact element has a multi-planar shape conforming to a shelf within the first slot or the second slot, said shelf differentiating the first axial length from the second axial length.

18. The device according to claim 17, wherein the multi-planar shape comprises opposing terminal ends, said opposing terminal ends each having a biasing member associated therewith to maintain electrical contact with batteries inserted into the battery compartment.

19. The device according to claim 1, further comprising a third slot positioned within the body which may receive at least one battery of a third battery type, said third slot having a cross sectional shape that is different than the first cross-sectional shape and the second cross-sectional shape and wherein the cross sectional shape of the third slot overlaps with at least one of the first cross-sectional shape and the second cross sectional shape to form a single cavity with three segments defined, at least in part, by at least four projections extending into the cavity, said at least four projections cooperating with the first slot, the second slot, and the third slot to immobilize radial movement of batteries inserted therein independent of any compressive force exerted between the distal contact element and the unitary contact element.

20. The device according to claim 1, wherein the overlap of the first cross-sectional shape and the second cross-sectional shape prevents the first slot from receiving at least one battery of the first battery type simultaneously with the second slot receiving at least one battery of the second battery type.

21. The device according to claim 1, wherein the first cross-sectional shape and the second cross-sectional shape are each selected from: circular, oval, square, pentagonal, hexagonal, polygonal, asymmetrical, and combinations thereof.

22. The device according to claim 1, wherein at least one of the first slot and the second slot is defined by at least three sidewall segments, said at least three sidewall segments intersecting an imaginary arc of greater than 180 degrees in the radial plane.

23. The device according to claim 22, wherein at least two of the at least three sidewall segments serve as the at least two projections.

* * * * *